Jan. 26, 1954    K. WESTINGER ET AL    2,667,307
TRANSFER MECHANISM FOR CALCULATING MACHINES
Filed Jan. 3, 1952                                    10 Sheets-Sheet 1

INVENTORS:
KARL WESTINGER AND
ERNST ALTENBURGER
AND OTTO HIRT
BY:

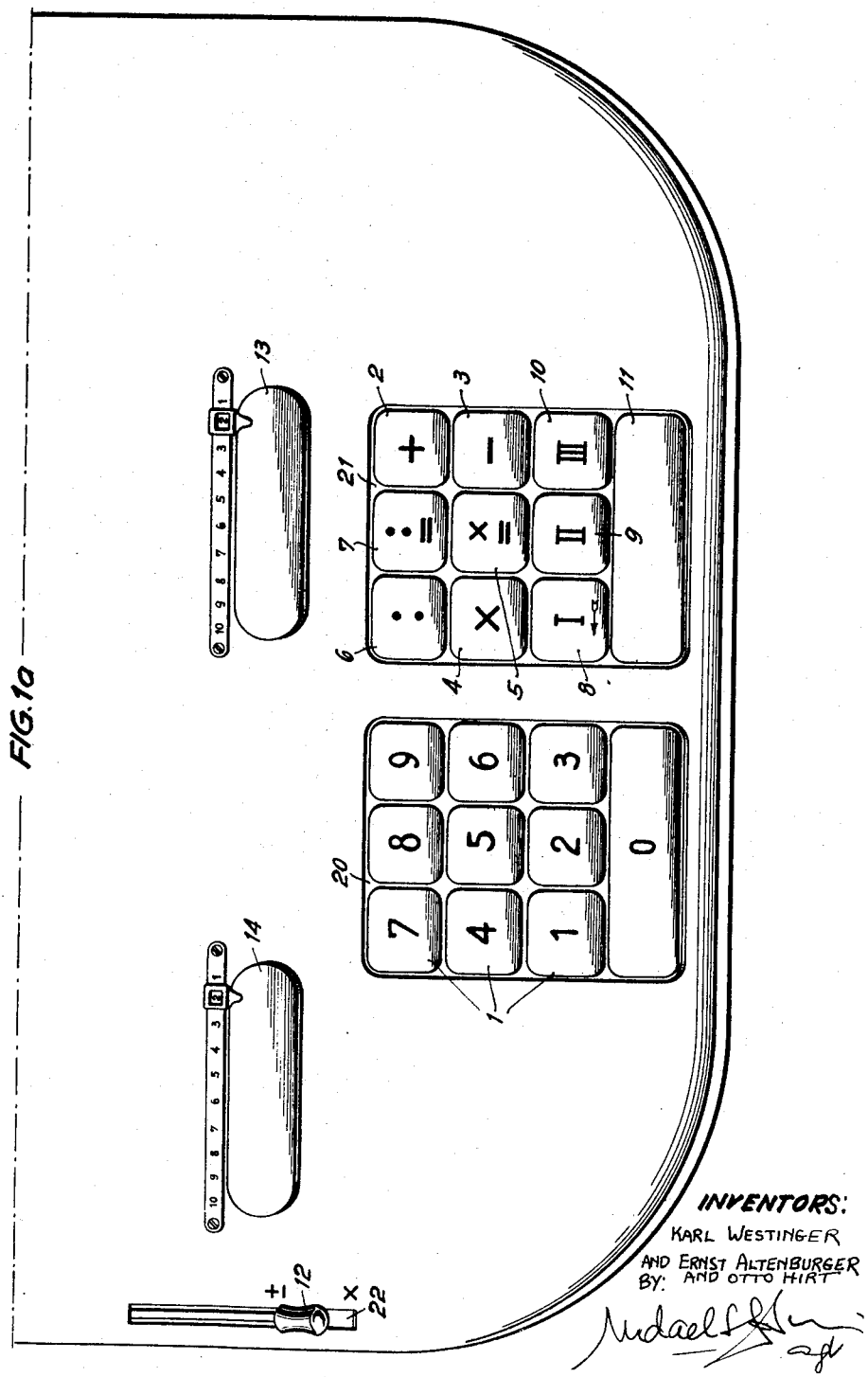

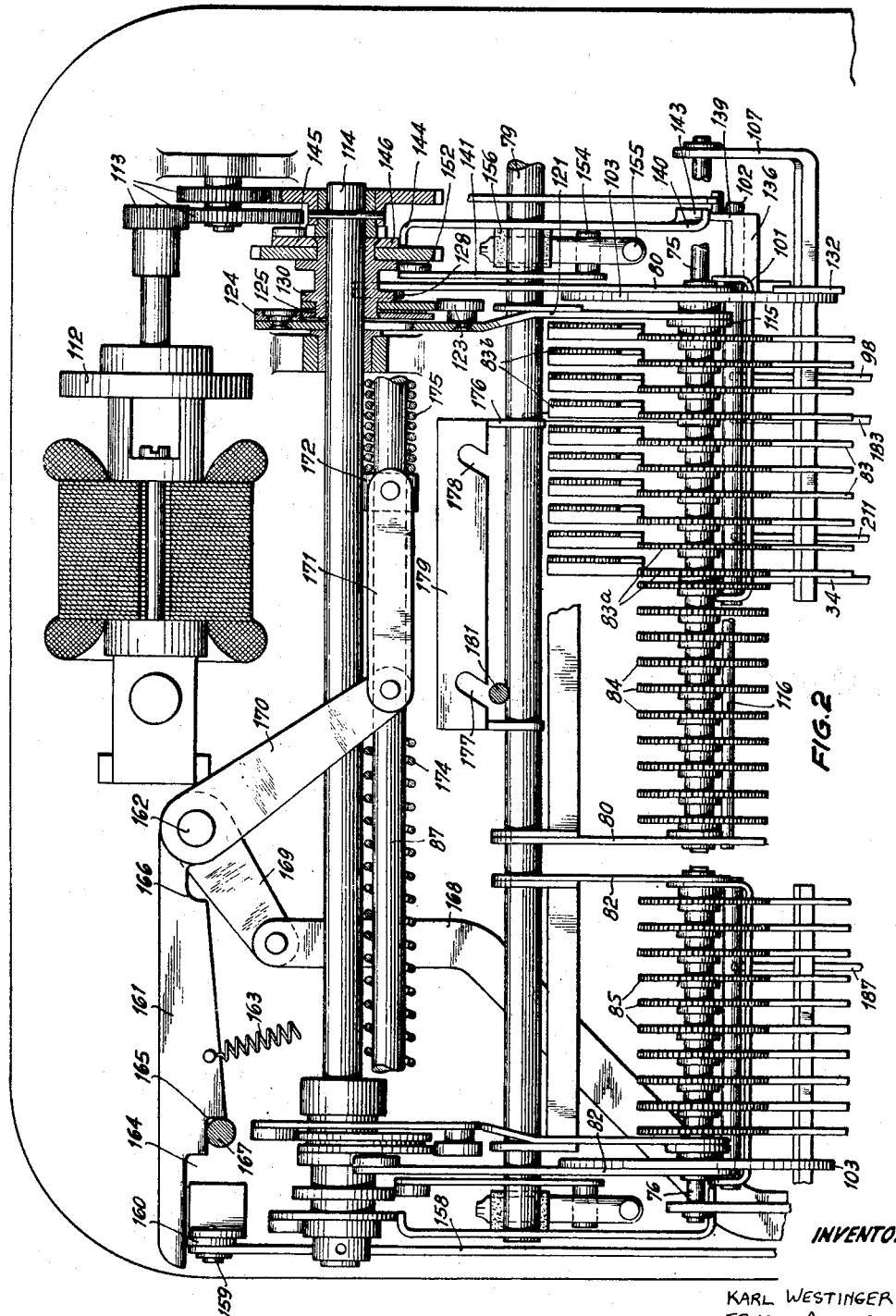

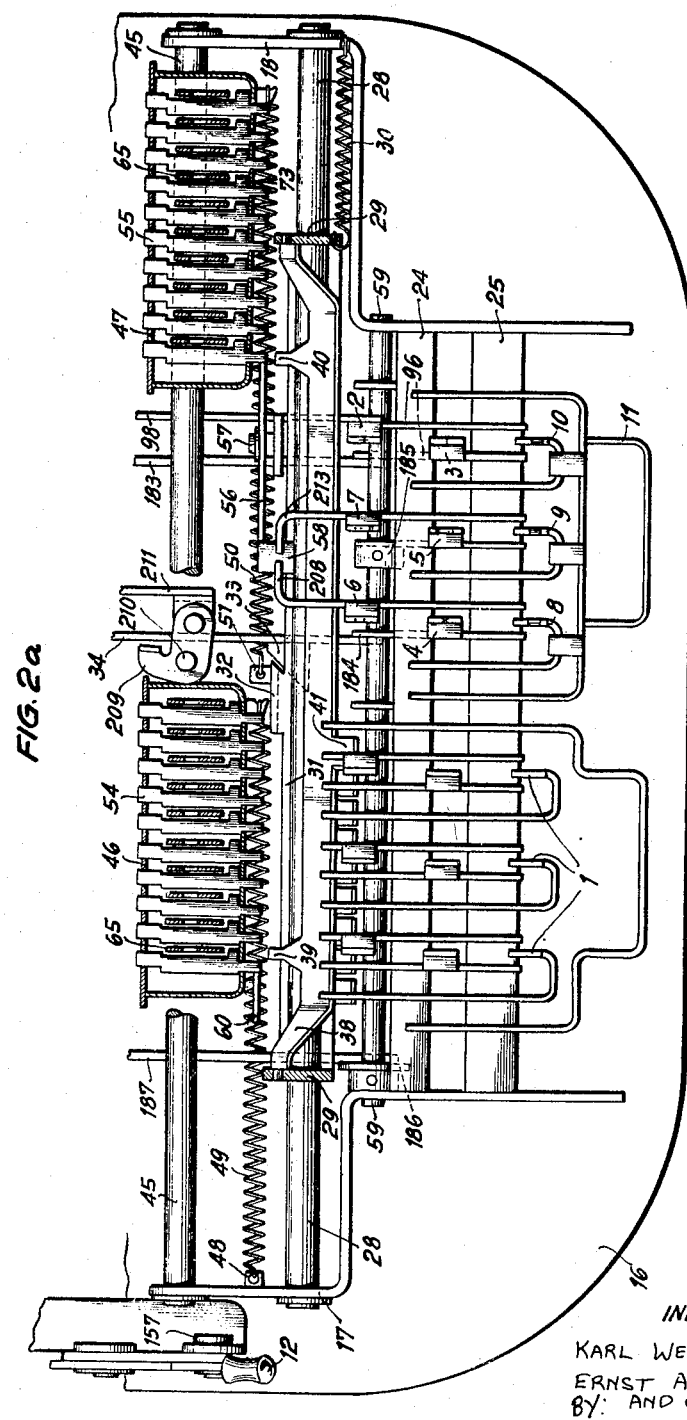

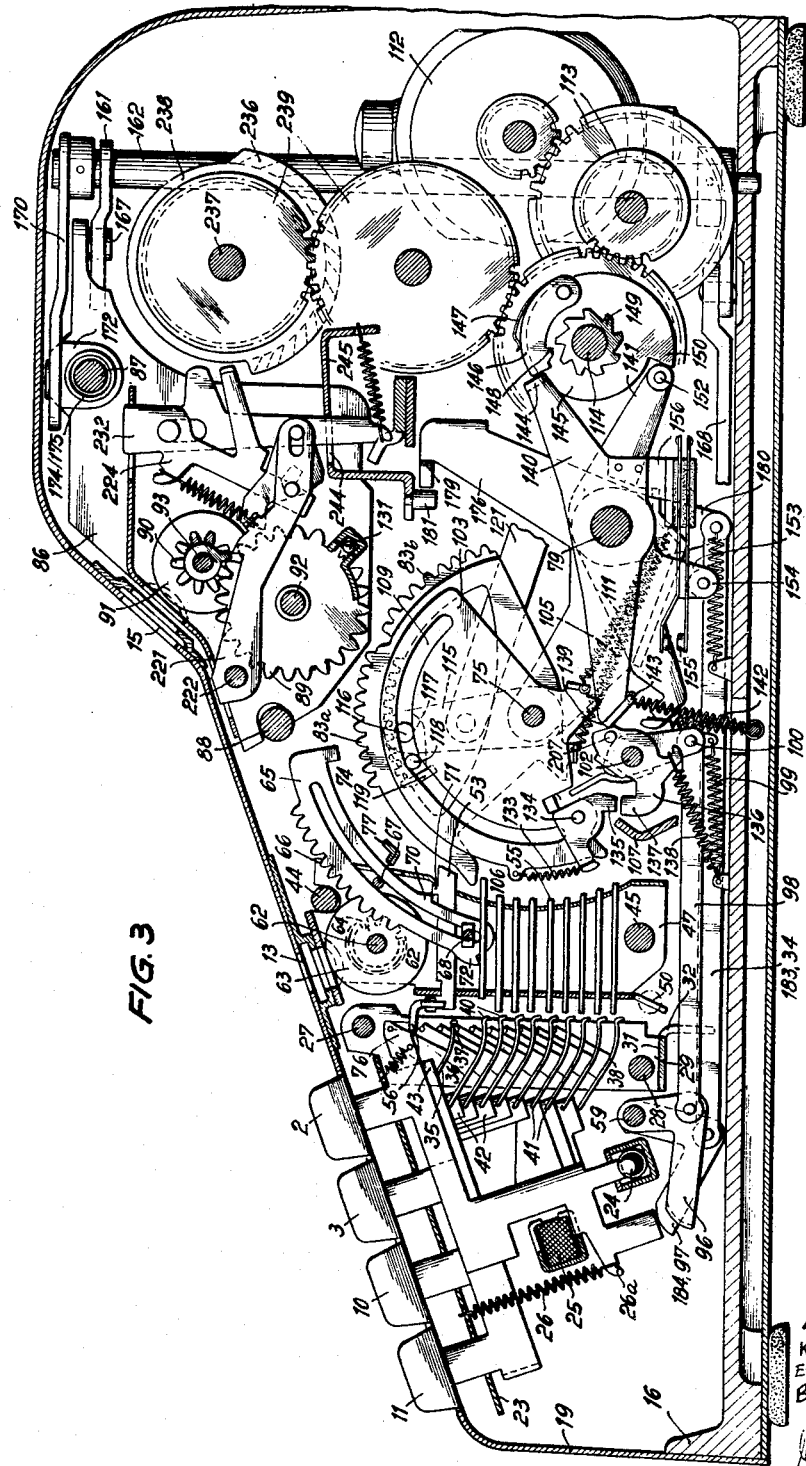

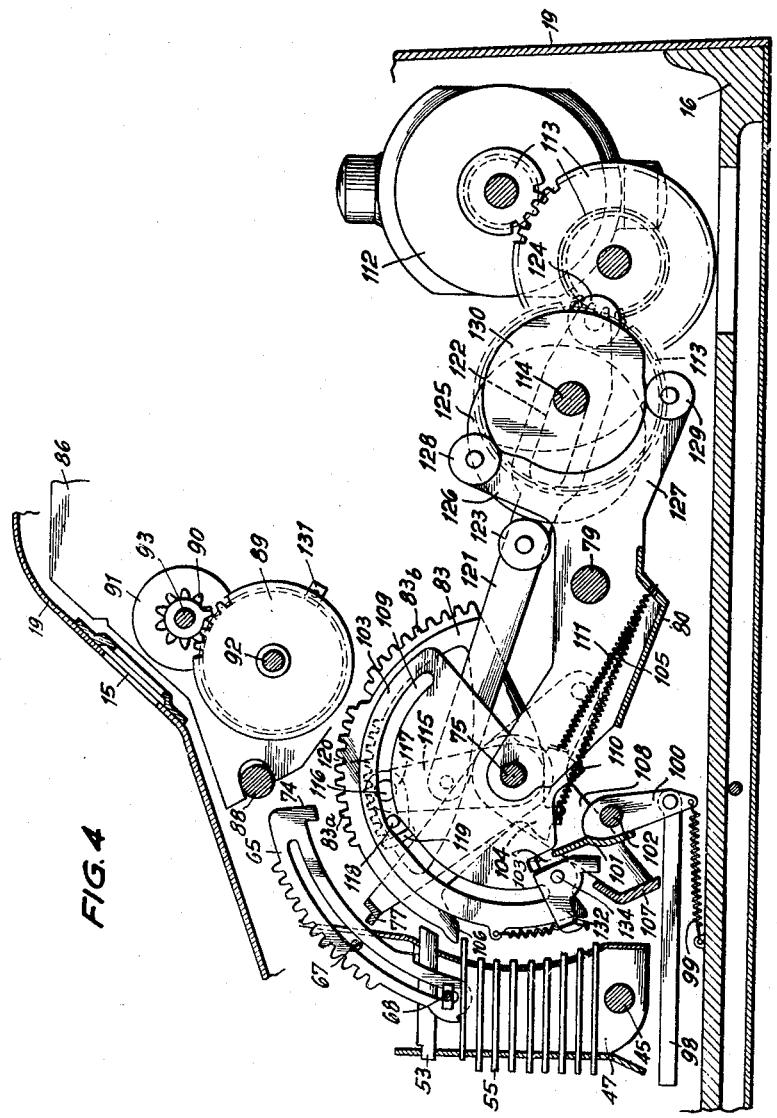

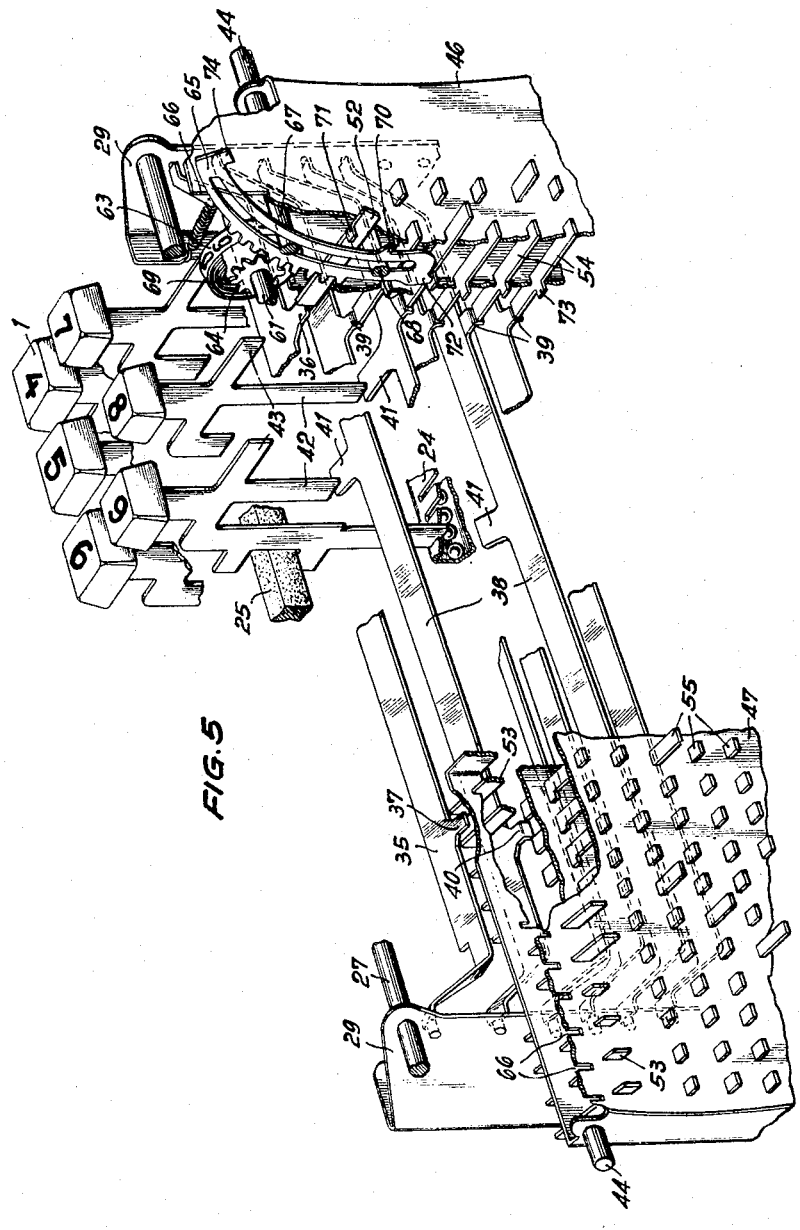

Jan. 26, 1954
K. WESTINGER ET AL
2,667,307
TRANSFER MECHANISM FOR CALCULATING MACHINES
Filed Jan. 3, 1952
10 Sheets-Sheet 8
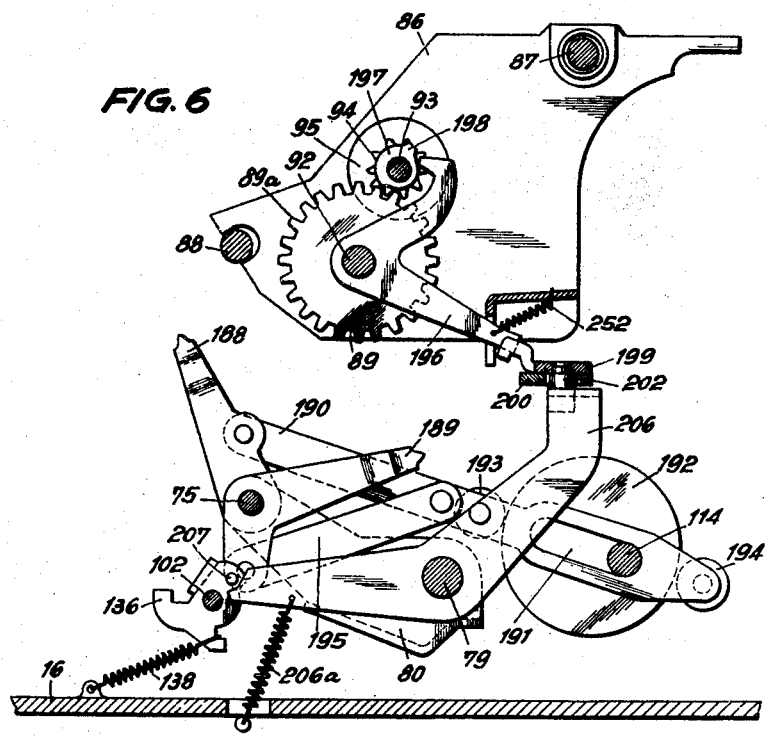
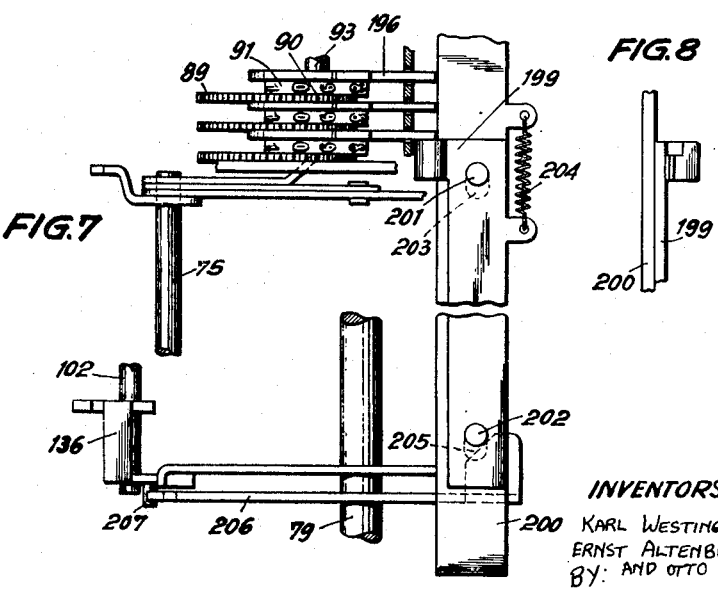
INVENTORS:
KARL WESTINGER AND
ERNST ALTENBURGER
AND OTTO HIRT

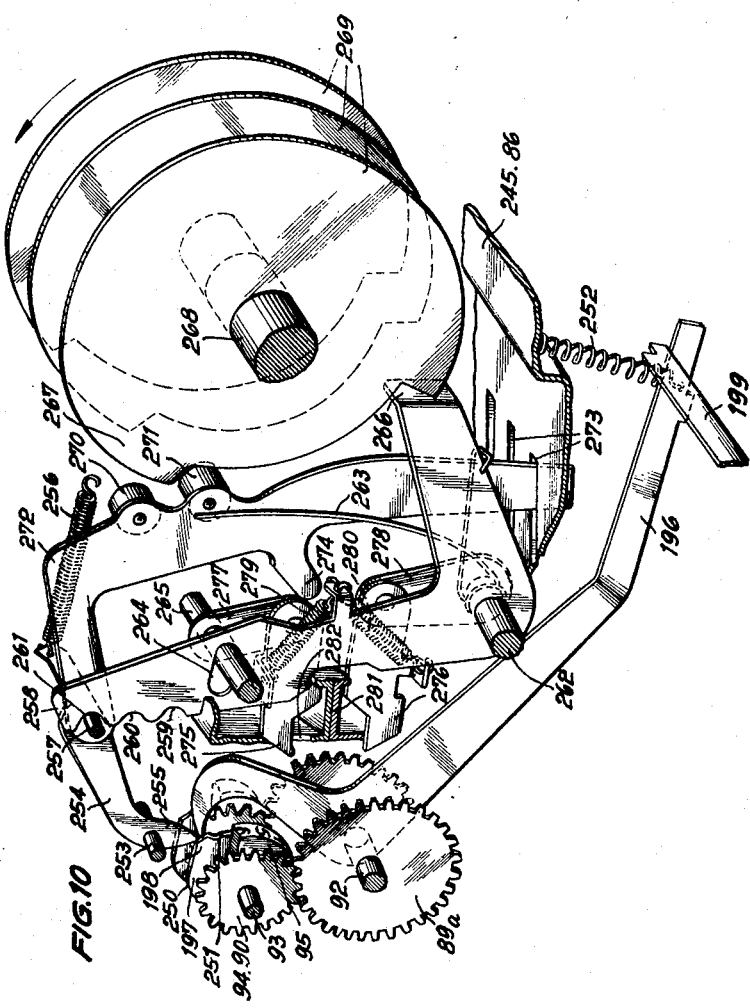

Patented Jan. 26, 1954

2,667,307

UNITED STATES PATENT OFFICE 2,667,307

TRANSFER MECHANISM FOR CALCULATING MACHINES

Karl Westinger, Ernst Altenburger, and Otto Hirt, Oberndorf, Neckar, Germany

Application January 3, 1952, Serial No. 264,774

Claims priority, application Germany January 4, 1951

12 Claims. (Cl. 235—137)

The present invention relates to calculating machines.

More particularly, the present invention relates to that type of calculating machine which includes a single set of ten keys for setting numbers into the machine and which is capable of adding, subtracting, dividing and multiplying.

One of the objects of the present invention is to greatly simplify the construction of known machines of this type while rendering the same convenient to use.

An additional object of the present invention is to provide a means for maintaining the numbers set into the machine visible to the operator during the operation of the machine.

Yet another object of the present invention is to provide a means for joining one set of ten keys to two sets of movalbe pin carriages for setting the numbers into the machine.

Still another object of the present invention is to provide a very simple and effective means for interconnecting the calculating mechanism of the machine with the mechanism for registering the numbers set into the machine.

A further object of the present invention is to provide the calculating mechanism of a calculating machine with an improved tens-carrying device.

A still further object of the present invention is to provide a tens-carrying device of the above type which will not cause a wheel actuated by the same to run over so that no braking mechanisms are required.

The objects of the present invention also include the provision of a tens-carrying device having all of the above advantages and being adapted to be used with the revolution counter of the calculating machine.

Another of the objects of the present invention is to incorporate features capable of accomplishing all of the above objects into a machine which operates on the so-called shortened multiplication principle.

With the above objects in view, the present invention mainly consists of a calculating machine having a single set of ten digit keys for setting numbers into the machine. A pair of pick-up means are mounted in the machine for independent movement, these pick-up means being in the form of pin carriages adapted to pick up the numbers set into the machine by the digit keys. A support with swing members thereon is mounted in the machine between the digit keys and pin carriages, and this support is laterally shiftable so that the digit keys may selectively operate on either one of the pin carriages.

Mounted on each of these pin carriages is an apparatus for indicating to the operator the number set into the pin carriage so that the operator may continually see this number during a calculation by the machine. This indicating apparatus preferably takes the form of a plurality of numbered wheels which cooperate with the pins of a pin carriage to automatically indicate the numbers set into the pin carriage.

The invention also includes the provision of a novel structure for transferring the numbers set into the pin carriages to other calculating mechanisms of the calculating machine. This novel structure includes a plurality of gear sectors located beside each other and being mounted on the machine for rotation about a single axis, these gear sectors being located adjacent to one of the pin carriages so as to cooperate therewith, and the several sectors being adapted to assume a particular angular relationship with respect to each other in accordance with the arrangement of the pins on the pin carriage, the latter arrangement being determined by the numbers set into the machine. A locking means cooperates with the gear sectors to lock them in the above-mentioned angular relationship. The sectors are then turned about the above-mentioned axis through a single angle, after being raised by a cam and lever arrangement into meshing engagement with gears of a result indicating mechanism of the machine. Each of the gear sectors include a set of additive gear teeth and subtractive gear teeth staggered with respect to the additive teeth.

The present invention also includes a provision of a tens-carrying mechanism, the latter comprising a pawl member which is pivotally mounted on the machine for movement toward and away from a gear associated with a numbered wheel of the machine. A guide means is associated with the pawl member for guiding the same first radially toward the above-mentioned gear, then tangentially with respect thereto so as to turn the same, and finally radially away therefrom, the pawl member bearing against the gear after turning the same through the desired distance so that no overrunning of the gear and numbered wheel can occur. No springs are connected to this pawl member.

The invention also includes the provision of a tens-carrying mechanism for a revolution counter, this mechanism being adapted to cooperate with a part of the mechanism for carrying out a multiplication. This tens-carrying mechanism includes a pivotally mounted lever which bears with one end thereof against a cam of the multiplication mechanism so as to be turned in opposite directions depending upon the rotation of the cam. The mechanism includes two pawl members one of which is in a position to turn a gear associated with a numbered wheel additively and the other of which is in a position to turn this gear subtractively. The lever associated with the above-mentioned cam is interconnected with a pawl moving means by a structure which locates the latter moving means in a position to move one or the other of the pawls depending upon the direction in which the cam turns the lever associated therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 1 and 1a together show a top plan view of a calculating machine constructed in accordance with the present invention and having the cover thereof broken away at a few places to indicate parts of the machine beneath the cover;

Figs. 2 and 2a together show a plan view of the machine of the present invention with the cover removed and with some, but not all, of the mechanism within the machine being illustrated;

Fig. 3 is a side sectional view of the machine of Figs. 1 and 2 also with some, but not all, of the inside parts of the machine being illustrated;

Fig. 4 is a fragmentary side view, partly in section, of a part of the mechanism of a machine constructed in accordance with the present invention;

Fig. 5 is a fragmentary isometric view of some of the digit keys of the machine and parts associated therewith, the structure of Fig. 5 being viewed from the rear of the machine;

Fig. 6 is a side view, partly in section, of another part of the mechanism of a machine constructed in accordance with the present invention;

Fig. 7 is a fragmentary plan view of a part of the mechanism of a machine constructed in accordance with the present invention;

Fig. 8 is a fragmentary elevational view of a detail of the mechanism illustrated in Figs. 6 and 7;

Figure 9:
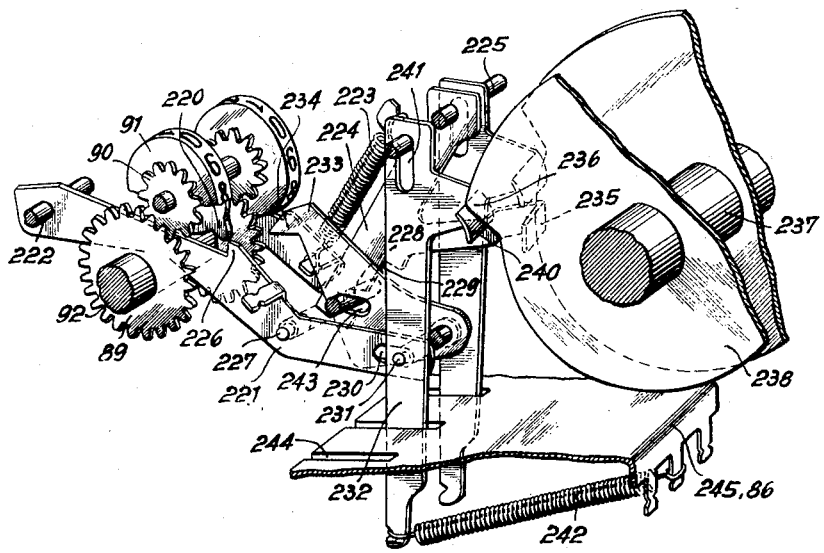

Fig. 9 is a fragmentary perspective view of a tens-carrying mechanism adapted to be used with the calculating mechanism of a machine constructed in accordance with the present invention as well as other calculating machines; and Fig. 10 is a fragmentary perspective view of a tens-carrying mechanism adapted to be used with a revolution counter of a machine constructed in accordance with the present invention, as well as other calculating machines.

As is shown in Fig. 1a, the calculating machine includes one set of keys 1 for setting numbers into the machine and another set of keys 2—11 for carrying out the various functions of the machine. The machine is provided with a cover 19 formed with an opening 20 in which the keys 1 are located and an opening 21 in which the keys 2—11 are located. The key 2 is used for addition; key 3 is used for subtraction; key 4 is depressed after the multiplicand is set into the machine and before the multiplier is set into the machine; key 5 is depressed to give the result of the multiplication; key 6 is depressed after the dividend is set into the machine and before the divisor is set into the machine; and key 7 is depressed after the divisor is set into the machine in order to give the quotient. The keys 8—10, respectively, remove various numbers from the machine, and key 11 removes all numbers from the machine and sets it into its starting position.

The cover 19 is provided with windows 13, 14 and 15. The window 13 shows the numbers which are being added or subtracted, and also the multiplicand, dividend and divisor appear in this window. The window 14 at the left-hand side of the machine shows the multiplier, and the window 15 shows on the right-hand side thereof the results of addition, subtraction and multiplication as well as the dividend. In the left-hand part of window 15, as viewed in Fig. 1, there appears the multiplier and the quotient.

Figure 1:
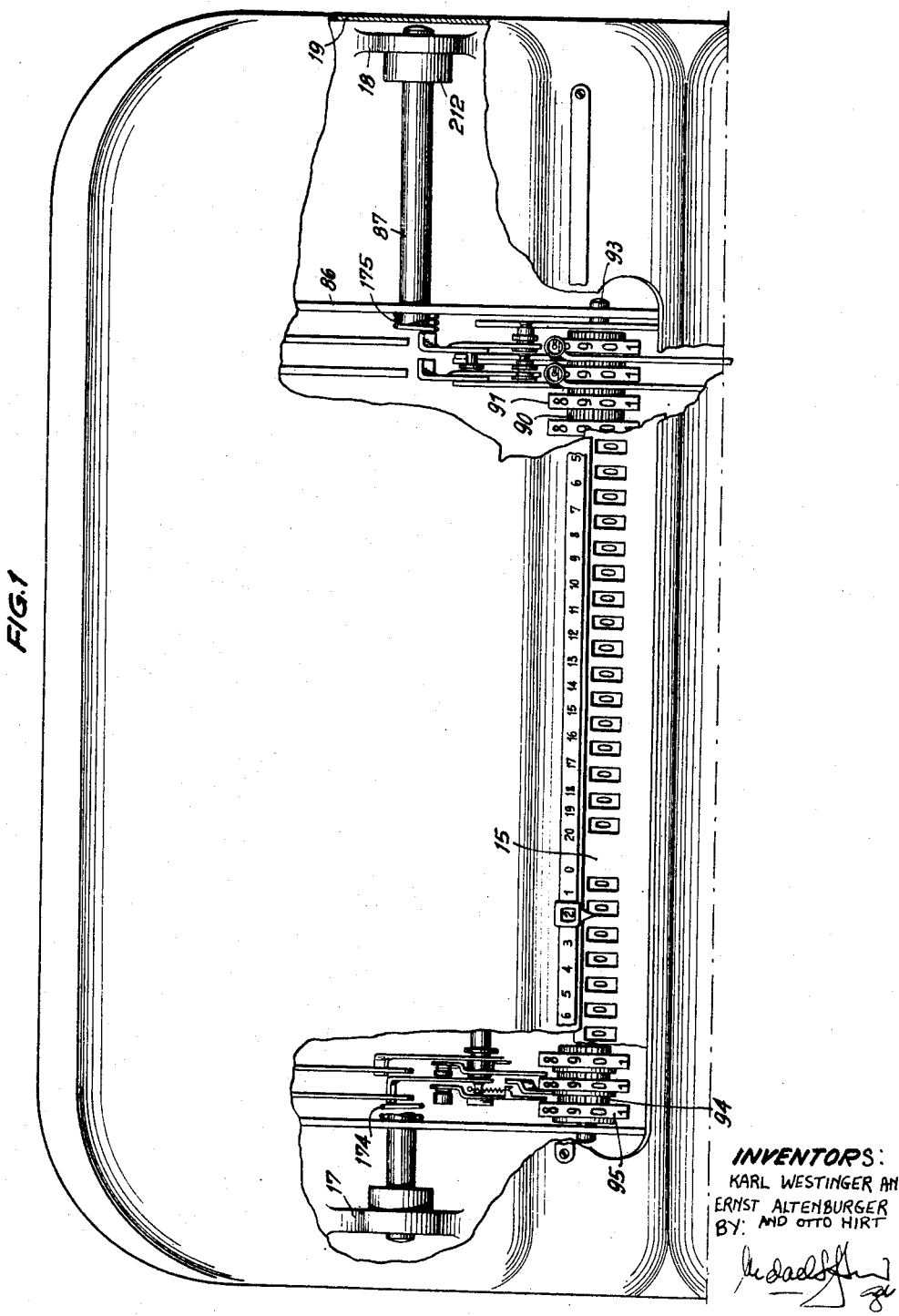

As is apparent from Fig. 1, the machine also includes a selection lever 12 which is adjustable between a central position when the machine is to carry out addition and subtraction, a lower position when the machine is to carry out multiplication, and an upper position when the machine is to carry out division.

The numbers which are added or subtracted disappear after each cycle of operation of the machine. Also, the dividend which appears in window 13 disappears after it is carried over into the result-indicating mechanism and then appears in the right-hand part of window 15. The multiplier appearing in window 14 and the multiplicand and divisor appearing in window 13 remain visible in these windows until the end of the calculation.

As is shown in Fig. 3, the entire machine is mounted on a base plate 16 formed with several side wall portions 17 and 18 (Fig. 2) to support various parts of the machine, the parts 17 and 18 being diagrammatically illustrated in the drawings. In addition to the above-mentioned cut-outs 20 and 21 of cover 19, the latter is formed with a slot 22 through which the lever 12 extends.

All of the keys 1—11 are guided in a slotted guide plate 23, as is shown in Fig. 3, and in a detent device which includes the ball members 24 for permitting only one key to be depressed at one time. Two of these detent devices may be provided, one for the keys 1 and the other for the keys 2—11 so that one of the latter set of keys may be depressed simultaneously with depression of any of the keys 1. The downward movement of the keys is limited by an elastic bar member 25 which extends over the width of the entire machine. To each of the keys there is connected a spring 26 which is also connected to the plate 23 so that the keys are urged into their upward, inoperative position. Each of the keys includes an extension 26a to which the spring 26 is connected, as is shown in Fig. 3.

Referring now to Figs. 2, 3 and 5, and particularly to the latter, it will be seen that the sides 17 and 18 of the machine carry a pair of horizontal transversely extending shafts 27 and 28 upon which a support 29 is mounted for lateral movement, this support 29 being located behind the keys 1—11. As is shown in Fig. 2, a spring 30 is connected to the support 29 and side 18 of the machine to resiliently urge support 29 to the right, as viewed in Fig. 2. The movement of support 29 to the right is limited by a stop member 32 mounted on lower portion 31 of the support 29 and being bent therefrom, this stop 32 having an inclined surface which engages a member 33 which has an inclined surface mating with the inclined surface of stop 32. The member 33 is fixedly mounted on an elongated rod 34 which is adapted to be moved upon actuation of key 4, as will be described below.

The support 29 carries an upper swing member 35 which is pivotally mounted on opposite sides of the support 29, as shown in Fig. 5, this swing member 35 being provided with two rearwardly extending projections 36 and 37. The support 29 carries below the swing member 35 nine additional swing members 38 which are similar to swing member 35 and which correspond in a downward direction to the digits 9, 8, 7, 6 . . . 1.

These swing members 38 are each provided, directly under the projections 36 and 37, with rearwardly extending projections 39 and 40. The swing members 38 are each provided with a forwardly extending projection 41 which is arranged to cooperate only with one key 1, each swing member 38 being associated with a different key 1. Thus, as is clearly illustrated in Fig. 5, the part 42 of key 9 is located directly over the projection 41 of the first swing member 38 located directly beneath swing member 35, the part 42 of key 8 is located over the projection 41 of the next lowest swing member 38, etc. All of the keys 1 are respectively provided with rearwardly extending projections 43 all of which are located over swing member 35 so that the latter is turned on carriage 29 irrespective of which key 1 is depressed.

Behind the carriage 29 there are located two horizontal, transversely extending shafts 44 and 45 upon which are slidably mounted the pin carriages 46 and 47 each of which forms a pickup means for picking up the numbers set into the machine by keys 1, so that these numbers may be transmitted to other parts of the mechanism. The carriages 46 and 47 are independently movable on shafts 44 and 45. The left-hand carriage 46, as viewed in Fig. 2, is urged to the left by a spring 49 which is fixed at one end to the eye 48 and which is fixed at its opposite end to the right-hand side of carriage 46. A spring 50 is fixed at one end to the eye 51 and at its opposite end to the right-hand side of carriage 47 to urge the latter to the left, as viewed in Fig. 2.

Both of the carriages 46 and 47 are provided adjacent the upper parts thereof with pins 52 and 53, respectively, the carriage 46 carrying vertical rows of pins 54 respectively located directly beneath each pin 52 and the carriage 47 carrying vertical rows of pins 55 respectively located directly beneath each pin 53. All of these pins 52—55 extend through the front and rear walls of the carriages 46 and 47 which are provided with slots for slidably guiding the pins 52—55. The number of vertical rows of pins corresponds to the number of digits in the largest numeral which the machine is capable of handling.

The right-hand pin carriage 47, as viewed in Fig. 2, is prevented from moving to the left under the action of spring 50 by the engagement of one of the pin members 53 with a stop member 56, this latter being pivotally mounted at 57 and provided with a plate portion 58 for reasons stated below. Thus, upon depression of any one of the keys 1, the swing member 38 corresponding thereto will be turned by engagement of projection 41 with part 42, and the projection 40 of this swing member 38 will push the proper pin 55 to the rear. Also, the swing member 35 will be swung so that projection 37 thereof pushes the pin 53 resting against stop 56 to the rear, and as a result the right-hand pin carriage 47 moves to the left under the action of spring 50 until the next pin 53 engages the stop 56. In this manner the number set into the machine causes a corresponding setting of the pins of carriage 47 which moves to the left after each number key 1 is depressed.

If the machine is being used for multiplication, the multiplicand is set into the pin carriage 47, and the multiplier is set into the pin carriage 46. In order to provide independent operation of carriages 46 and 47, the projections 36 and 37 of swing member 35 as well as the projections 39 and 40 of swing members 38 are spaced from each other by a distance equal to the space between corresponding vertical rows of pins of the carriages 46 and 47 plus one half of the distance between two adjacent vertical rows of pins. Therefore, when the projections 37 and 40 are located directly in front of a vertical row of pins of pin carriage 47, the projections 36 and 39 will be located between a pair of adjacent vertical rows of pins of carriage 46 so that the latter carriage will remain unaffected during movement of the pins of carriage 47. In the same way when the pins of carriage 46 are moved by projections 36 and 39, the pins of carriage 47 remain unaffected.

The multiplication key 4 which is depressed after the multiplicand is set into the machine and before the multiplier is set into the machine, is provided adjacent its lower end with a structure similar to that shown in Fig. 3 for the addition key 2, so as to actuate a lever 184 pivotally mounted on the stationary shaft 59 extending laterally across the machine. The rod 34, which was referred to above, is linked to the lever 184, which is constructed in the same way as the levers 96 and 97 appearing in Fig. 3, and as a result, when key 4 is depressed, the rod 34 with member 33 mounted thereon is moved rearwardly so that the member 33 engages the inclined surface of stop 32 of the support 29 to move the latter to the left by a distance equal to one half of the space between adjacent vertical rows of pins. The key 4 may be held in its depressed position by the operator while the multiplier is set into the carriage 46 with the keys 1, or any suitable lock means may be provided to hold key 4 depressed while the multiplier is set into the machine. If desired, the ball members 24 of the above-mentioned detent mechanism cooperating with the keys 2—11 may be designed to frictionally engage the key 4 to maintain the same depressed until another of the keys 2—11 is depressed, the key 11 then being designed to move any depressed keys 2—10 upward. Thus, after depression of key 4 the projections 36 and 39 will be located directly opposite the pins of carriage 46, and in this way the multiplier is set into the carriage 46, while the projections 37 and 40 are located between a pair of adjacent vertical rows of pins of carriage 47 so that the latter remains unaffected. The pins 52 of carriage 46 are adapted to successively engage the stationary stop 60 (Fig. 2a) so that the carriage 46 steps to the left under the influence of spring 49 after each digit of the multiplier is set into the machine, the pins 52 cooperating with stop 60 in the same way that the above-described pins 53 cooperate with the stop 56.

In order to enable the machine to retain the multiplicand and multiplier visible to the operator after these numbers have been set into the machine, the pin carriages 46 and 47 are provided with shafts 61 and 62 on which numbered wheels 63 are located, these wheels 63 being visible through the windows 13 and 14. Each wheel 63 has fixedly connected thereto a gear 64, each gear 64 meshing with an arcuately slotted gear sector 65. The gear sectors 65 respectively extend through guide slots 66 formed on the rear wall of the carriages 46 and 47 and are guided for movement on shafts 67 and 68 which are mounted in each of the pin carriages 46 and 47.

The numbered wheels 63 are hollow and within each of these wheels there is mounted a helical spring 69 joined at one end to the shaft 61 or 62 and at an opposite end to the inner surface of wheel 63 so as to urge the latter to rotate with respect to shaft 61 or 62. The springs 69 urge the wheels 63 in a clockwise direction about shaft 61 or 62, as viewed in Fig. 3, so that the gears 64 urge the sectors 65 in a downward direction. In the rest position of sectors 65, the latter are prevented from moving downwardly by the engagement of the rearwardly extending projection 70 of each sector 65 with a lateral projection 71 of each pin 52 and 53. Upon movement of the pins 52 or 53 to the rear by projections 36 or 37 of swing member 35, the projections 71 are moved out of engagement with projections 70, and the gear sectors 65 move downwardly under the influence of springs 69 which then rotate the numbered wheels 63. Upon movement of one of the pins 54 or 55 to the rear by a projection 39 or 40 of swing members 38, a lateral projection 73 on each of these pin members 54 and 55 is moved into the path of movement of the lower projection 72 of a sector 65, so that the downward movement of the latter is arrested by engagement with the lateral projection 73 of the particular pin which has been moved upon the depression of one of the keys 1. The pins 54 and 55 correspond to numbers 9, 8, 7 ... 1 in a downward direction and the springs 69 move the sectors 65 and numbered wheels 63 by a distance corresponding to the number of the particular key 1 depressed so that this number appears in the windows 13 and 14. No pins are provided for the digit 0 so that when a 0 is set into the machine a sector 65 moves downwardly until its lower end 72 engages the lower shaft 45 of the pin carriages 46 and 47.

As is diagrammatically illustrated in Fig. 3, a pair of angular bar members 77 extend laterally across the machine, are respectively located behind the carriages 46 and 47 and are mounted on levers which are turnable on the shafts 75 and 76 (Fig. 2). The drive means of the calculating machine is interconnected by any suitable mechanism, such as cams and levers, with the levers supporting bar members 77 so as to turn the latter upwardly and into engagement with the rearwardly extending upper projection 74 provided on each gear sector 65 so as to return the latter to its starting position and so as to remove the numbers from windows 13 and 14.

The above described structure may be used with any suitable mechanism for transferring the numbers set into pin carriages 46 or 47 to the calculating mechanism, although a particular transfer mechanism will now be described.

The above mentioned shaft 75, about which the zeroing bars 77 turn, is mounted on a frame 80 that is pivotally mounted on a stationary shaft 79 extending horizontally across the entire machine, as is most clearly shown in Fig. 2. The above mentioned shaft 76, located on the left side of the machine as viewed in Fig. 2, is mounted on a frame 82 in exactly the same way as shaft 75 is mounted on frame 80, this frame 82 also being mounted on stationary shaft 79 for turning movement thereabout.

A number of gear sectors 83 are mounted on the shaft 75 for turning movement thereabout, these gear sectors 83 corresponding in number to the capacity of the machine and being adapted to transfer the numbers set into the pin carriage 47 to the result indicating mechanism located above gear sectors 83. Each gear sector 83 is provided with one set of additive gear teeth 83a and one set of subtractive gear teeth 83b. To the left of sectors 83 there are mounted on the shaft 75 a plurality of gear sectors 84 having only one set of teeth corresponding to teeth 83a of sectors 83. The several sectors 84 are spaced from each other by a distance equal to the space between the several sectors 83, but the extreme right-hand sector 84 shown in Fig. 2 is spaced from the extreme left-hand sector 83 by a distance equal to one half the distance between each of the sectors 83. On the left-hand shaft 76 there are located a plurality of sectors 85 each of which includes teeth corresponding only to teeth 83a of sectors 83, these sectors 85 cooperating with a revolution counting mechanism located thereover, the number of sectors 85 corresponding to the desired capacity of the multiplier and quotient to be handled by a machine.

Over the entire groups of sectors 83, 84 and 85 there is located a carriage 86 which is laterally slidable on guide shafts 87 and 88 which are stationary in the machine. The carriage 86 carries on the right hand side thereof, as viewed in Fig. 2, the result indicating mechanism which calculates the results of addition, subtraction and multiplication and which takes up the dividend transferred from pin carriage 47 by sectors 83 in a manner described below. This result indicating mechanism includes an intermediate gear 89 for each of the sectors 83 and 84 and adapted to cooperate therewith, these intermediate gears 89 each meshing with a gear 90. Each of the gears 90 has fixed thereto a numbered wheel 91 visible in the right hand part of window 15. All of the intermediate gears 89 are mounted for rotation on the shaft 92 of carriage 86, and the gears 90 and numbered wheels 91 are mounted for rotation on the shaft 93 of carriage 86, these shafts 92 and 93 being supported by the side walls of carriage 86. The calculating and result indicating mechanism 89, 90 includes a tens-carrying mechanism which may be of any suitable known construction or which may be constructed in the manner described below.

The revolutions counter located at the left hand side of the machine is only fragmentarily illustrated in Fig. 1 where there are illustrated a few gears 94 of the same construction as gears 90 and each having a numbered wheel 95 fixed thereto. An intermediate gear 89a (Fig. 6) similar to gear 89 is associated with each of the gears 94 and cooperates with the gear sectors 85, located on shaft 76 (Fig. 2), in the same way that intermediate gears 89 cooperate with gear sectors 83 and 84. The gears 94 and numbered wheels 95 are rotatably mounted on the same shaft 93 which supports members 90 and 91 and the intermediate gears of the revolution counter are rotatably mounted on the same shaft 92 as the intermediate gears 89. The revolutions counter also includes a tens-carrying mechanism which may be of any suitable construction or which may be constructed as described below.

The gear sectors 83 are each connected to a spring 105 which urges the gear sector connected thereto in a counterclockwise direction, as viewed in Fig. 3. Each of the gear sectors 83 include a lower forwardly extending projection 104 which, in the position of rest of gear sectors 83, rests upon the upper edge of a tiltable rail member 101. This rail member 101 is part of a box-like structure which is mounted for rotation on a stationary shaft 102 extending across the machine, this structure including a cross rod 100 to which the rod 98 is linked, this rod 98 being linked to the lever 96 mounted for rotation on the stationary shaft 59, as shown in Fig. 3. The spring 99 (Fig. 4) urges the bar member 98 to the left, as viewed in Figs. 3 and 4, so as to tend to rotate rail member 101 in a clockwise direction. Upon depression of one of the function keys, the rod 98 is moved to the right against the action of spring 99 and rotates the rail member 101 in a counterclockwise direction so that the latter moves away from projections 104 of sectors 83 and the latter are thereby freed to the influence of springs 105 so as to be rotated in a counterclockwise direction, as viewed in Figs. 3 or 4. The sectors 83 are respectively provided with forwardly extending projections 106 which are respectively adapted to engage the pins 55 moved to the rear of carriage 47. Thus, when a number 9 is set into the device, one of the gear sectors 83 will turn through a very small distance, as shown in Fig. 4, and as the numbers decrease in value a gear sector 83 will turn through larger distances before engaging one of the pins 55. When a 0 is set into the machine, none of the pins of the pin carriages 46 and 47 will be moved, as was described above, and in this event a gear sector 83 will engage the upper edge of a rail member 107 which is mounted on the zeroing lever 108, the latter being mounted on shaft 75 for rotation thereabout. It will be noted from Fig. 2 that subtractive teeth 83b of sectors 83 are displaced from the additive teeth 83a by a distance equal to one half of the distance between adjacent sectors 83.

During multiplication with digits 1–5 and addition the intermediate gears 89, which are rotatable on shaft 92, mesh with the tooth portions 83a of sectors 83, while during multiplication with digits 6–9 and subtraction, the intermediate gears 89, as a result of a lateral movement of carriage 86 by structure to be described below, mesh with tooth portions 83b of sectors 83.

After rail 101 has been turned so as to permit the sectors 83 to turn under the influence of springs 105 to an extent determined by the position of the pins of pin carriage 47, the gear sectors 83 are not yet in mesh with intermediate gears 89 because the sectors 83 are in the lower position illustrated in the drawings. It is only during the calculating cycle that the sectors 83 are raised into meshing engagement with intermediate gears 89 by a structure now to be described.

On the right hand side of sectors 83, as viewed in Fig. 2, there is located a sector-like plate member 103 which is pivotally mounted on the axis 75, this plate 103 being provided with a curved slot 109, as illustrated in Figs. 3 and 4. The plate 103 is provided with a projection 110 which bears against the upper edge of rail 101 when plate 103 is in its position of rest, the spring 111 being connected to plate 103 and urging projection 110 against rail 101. Upon counterclockwise turning of rail 101, as viewed in Figs. 3 and 4, the rail 101 frees plate 103 to the influence of spring 111, and the slot 103' formed in plate 103 moves over rail 101 until the upper edge of this slot rests against rail 101. This movement of plate 103 starts the drive motor of the machine in a manner to be described below.

On the shaft 75 and on opposite sides of the sectors 83 there are pivotally mounted two levers 115 through which a shaft 116 passes, this shaft 116 pivotally supporting a support 117 which is provided with a pin 118 located in slot 109 of plate 103, this slot having one portion located further from shaft 75 than another portion thereof.

The projection 110 of plate 103 extends to a greater distance from the shaft 75 than the projections 104 of sectors 83 so that, upon turning of rail 101, as was described above, the sectors 83 are first released to the influence of springs 105, and then the plate 103 is released to the influence of spring 111. Thus, after the sectors 83 have turned so that their projections 106 engage pins 55 of carriage 47, the plate 103 turns and moves its slot 109 over the pin 118 so as to move the latter upwardly. The sectors 83 are each formed with an opening having an upper edge portion formed with grooves 120 and the support 117 carries a locking bar 119 which extends through all of the openings of sector 83. Thus, the upward movement of pin 118 causes an upward movement of locking bar 119 so that the latter enters into a groove 120 of each sector 83 and in this way locks the sectors 83 to the levers 115 which are rotatably mounted on shaft 75, as described above.

The right hand lever 115, as viewed in Fig. 4, is pivotally connected to a driving bar 121 which is formed with an elongated slot 122 located about the main operating shaft 114 which extends laterally across the machine, as shown in Fig. 2. Rotatably mounted on the driving bar 121 are a pair of rollers 123 and 124, these rollers being located on opposite sides of a cam 125 fixedly mounted on shaft 114 for rotation therewith, cam 125 being eccentrically mounted so as to cause reciprocating movement of driving bar 121. The movement of driving bar 121 causes turning movement of levers 115 on shaft 75 and in this way causes a similar turning movement of all sectors 83 which are locked to levers 115 by the locking bar 119, as described above. Because of the above construction all of the sectors 83 are turned through the same angle so that, in accordance with the particular angular relationship of sectors 83 determined by pins 55, more or less of the two portions 83a and 83b will engage the intermediate gears 89.

In order to bring about this latter engagement of sectors 83 with gears 89, the frame 80, upon which shaft 75 is mounted, is pivotally mounted about the stationary shaft 79, the frame 80 having a pair of extensions 126 and 127 at its right hand end, as viewed in Fig. 4, these extensions being respectively provided with rollers 128 and 129. The rollers 128 and 129 engage the periphery of a cam 130 fixed to the main shaft 114 of the machine for rotation therewith, and this cam 130 is so formed that the shaft 75 and the sectors 83 and plate 103 therewith are turned back and forth in opposite directions about shaft 79 during one rotation of cam 130. The cams 125 and 130 are so shaped and located out of phase with respect to each other that the cam 130 first turns the frame 80 in a clockwise direction about shaft 79 so as to move sectors 83 into mesh with intermediate gears 89, and then the cam 125 moves the driving bar 121 to the right, as viewed in Fig. 4, so that the sectors 83 are thereby turned in a clockwise direction about shaft 75. As a result of this arrangement a particular number of teeth of each sector 83 engages an intermediate gear 89 in accordance with the position of each sector 83 determined by a pin 55.

The arrangement is such that as sectors 83 are turned through greater distances by engagement with progressively lower pins 55, less additive teeth 83a and more subtractive teeth 83b engage the intermediate gears 89. Since the pins 55 of each vertical row correspond in a downward direction to numbers 9, 8, 7, 6, . . . 1 the additive teeth 83a turn the intermediate gears 89 through an angle corresponding and proportional to the digit represented by a particular pin 55, and the subtractive teeth 83b turn the intermediate gears 89 through an angle corresponding and proportional to the complement of the particular digit represented by a pin 55, this complement being the difference between 10 and the latter digit represented by pin 55.

Upon termination of the above described turning movement of the sectors 83, the frame 80 is turned back to its original position about shaft 79 by the cam 130 so that the sectors 83 are swung downwardly out of mesh with gears 89. During the remaining part of a revolution of the main operating shaft 114 of the machine, the frame 80 and its shaft 75 remain stationary while the cam 125 moves the driving bar 121 and pair of levers 115 back to their original position. During the time that this latter operation is taking place the tens-carrying mechanism operates on gears 90.

The elongated member 107 which is mounted on lever 108, the latter being turnable about shaft 75, is adapted to return the sectors 83 and plate 103 back to their original position. It will be noted that during clockwise turning of member 107 the lower edge portion thereof will engage the pins 55 of carriages 46 and 47 to return them to their original position. The zeroing members 77 and 107 may be operated by any suitable mechanism (not shown). For example, these members may be interconnected by a spring so that the movement of one of these members causes a resilient following movement in the other member. These members may be controlled, for example, by connection with a suitably shaped cam on shaft 114.

During multiplication with digits 1–5 and during addition, the sectors 83 remain in engagement with intermediate gears 89 until the end of their turning movement so that they leave the gears 89 at a turning speed of zero and in this way an overrunning of gears 90 is avoided. During multiplication with digits 6–9 and during subtraction, the tooth portions 83b move away from the intermediate gears 89 just at the moment when the sectors 83 are at their highest rotating speed, and therefore a suitable pawl device such as that illustrated diagrammatically at 131 in Fig. 4 must be provided to prevent overrunning of gears 90.

In order to avoid an excessive loading on the pins 55 by the sectors 83, the grooves 120 and locking bar 119 are so arranged that upon raising of locking bar 119 by the engagement of pin 118 and slot 109, as described above, the sectors 83 are raised a slight distance, such as, for example, 0.6 mm., to remove the weight of these sectors from the pins of the carriage 47.

The following mechanism is used to start the operation of the machine:

On the stationary shaft 59 which is located beneath the entire keyboard there is located, in the region of the lower portion of keys 2 and 3, a lever 96 which is located beneath both of these keys and which is linked to the rod 98 connected to cross rod 100 of the structure to which rail 101 is connected. The plate 103 turns under the influence of spring 111 upon turning of rail 101 in a counterclockwise direction, as was described above. As is shown in Figs. 3 and 4, a pivot pin 134 is fixedly mounted on the plate 103 and pivotally supports a pawl member 132 which is urged by spring 133 in a clockwise direction about pin 134 and which is provided with a lower extension 135. The pawl 132 engages, with its extension 135, an upper arm 137 of a second pawl 136 mounted for turning movement on the stationary shaft 102, as shown in Fig. 3, this pawl 136 being urged in a clockwise direction about shaft 102 by spring 138.

On the stationary shaft 79 there are pivotally mounted a pair of double arm levers 140 and 141 which are located beside each other. In Fig. 3, the lever 140 appears in front of the lever 141 and is urged by spring 142 in a counterclockwise direction about shaft 79, this lever 140 having on its left arm a bent stop portion 143 which, when the machine is in its position of rest, bears against the upper portion 139 of pawl 136. The right-hand arm of lever 140 is provided with a similar stop portion 144 which, in the position of rest of the machine, bears against a pawl member 146. The latter pawl member is pivotally mounted on a cam 145 that is loosely mounted on shaft 114 for free rotation with respect thereto, this pawl 146 being held by lever 140, against the action of leaf spring 147 which bears at one end thereof against pawl 146, in a position away from the ratchet wheel 149 fixedly mounted on shaft 114 for rotation therewith so that the tooth 148 of pawl 146 does not mesh with the teeth of wheel 149.

The spirally shaped cam 145 is provided with the step portion 150 which, in the position of rest of the machine, bears against the roller 152 of the double armed lever 141, the latter being urged in a counterclockwise direction about shaft 79 by the spring 151. The lever 141 is provided with a lower arm 153 which carries an electrically insulated roller 154. Upon turning of the cam 145, the lever 141 will be rotated in a clockwise direction against the action of spring 151, and the roller 154 will then move upwardly against a springy pair of contact members 155 which are located in the circuit of the motor 112 of the machine. These contacts 155 are mounted on a lower arm 156 of the lever 140 and are closed when, upon turning of lever 140 in a counterclockwise direction, the contacts 155 move against the insulated roller 154.

The above described mechanism for starting motor 112, which through gearing 113 drives the main operating shaft 114 of the machine, was described with reference to the calculating mechanism on the right hand side of the machine, as viewed in Fig. 2. It should be noted that the above-mentioned shaft 116 which is connected to levers 115, is rigidly fixed to the gear sectors 84 located to the left of sectors 83 so that during subtraction and division nines will be turned into the machine by the sectors 84.

The left hand calculating mechanism which operates as a revolution counter and whose sectors 85 are provided only with additive gear teeth is provided with a control and starting mechanism exactly as described above except that it is a mirror image of the above described structure since the plate 103 for this left-hand mechanism is located on the left side of sectors 85, as shown in Fig. 2, while the plate 103 for sectors 83 is located on the right side of the latter.

In order to use the right-hand result indicating mechanism and the left-hand revolution counter for the four different types of calculations, the lever 12 is brought into play. In the position illustrated in Figs. 1 and 2, the lever 12 is located in a position for adding and subtracting. As is shown in Fig. 2, the lever 12 is pivotally mounted on pin 157 and is pivotally connected to a bar 158 which extends to the rear of the machine and is linked to the upwardly extending lever 160 which is pivotally mounted on the pin 159 for turning movement thereabout. The lever 160 rests against a notched lever 161 which is mounted on and about the vertical rod 162 and which is urged by spring 163 in a counterclockwise direction about rod 162. The bar 161 is provided with a left-hand notch 164 for multiplication, a central notch 165 for addition and subtraction, and a right-hand notch 166 for division. A pin 167 fixedly connected to carriage 86 is in engagement with one of these notches.

In addition to the above described elements, the lever 12 is also linked to a laterally bent bar 168 which is linked to a lever 169 that is fixedly connected to the lower part of rod 162, the latter being rotatably mounted, for turning about its axis, on the base 16 of the machine. To an upper part of rod 162 there is fixedly connected a lever 170 which is linked to a bar 171 at one end of the latter. The bar 171 is linked at its opposite end to a sleeve 172 mounted for sliding movement along a shaft 87 which extends laterally across and through the carriage 86. The sleeve 172 is located between two coil springs 174 and 175 mounted on the guide shaft 87, these springs respectively bearing against the side walls of carriage 86 and the sleeve 172. In the position of the parts illustrated in Fig. 2, the spring 175 urges the carriage 86 to the right, while, when the machine is in position for division, the spring 174 is compressed and urges the carriage 86 to the left.

In order to be capable of carrying out subtraction, division and multiplication, the machine is provided in addition to the above described structure with the following parts:

Pivotally mounted on the shaft 79 is a two-armed support 176 having an upper rail 179 provided with a pair of inclined, open-ended slots 177 and 178, as shown in Fig. 2. The right arm of support 176, as viewed in Fig. 2, terminates at its lower end in an eye 180, as is shown in Fig. 3. The slots 177 and 178, upon turning of support 176, move forwardly, and a pin 181 of carriage 86 engages one of these slots to move the carriage 86 to the right, as viewed in Fig. 2. In this way the intermediate gear wheels 89 of the calculating mechanism are moved into a position over the subtractive gear teeth 83b of sectors 83 so as to mesh with these subtractive teeth when the sectors 83 are raised as described above. This meshing of gears 89 with teeth 83b is necessary during subtraction and division. Therefore, there is provided under the downwardly extending foot of the subtraction key 3 a lever 97 which also extends beneath a portion of the division key 7, this lever 97 being pivotally mounted on shaft 59 and linked to an elongated bar or rod 183 which is pivotally connected to the eye 180 of the support 176.

Beneath the multiplication key 4, as was described above, there is provided a lever 184 similar to lever 97, this lever 184 being shown in Fig. 2 and being connected to the rod 34 as described above. The rod 34 is connected to the cross rod 100 of the structure supporting rail 101 so that upon actuating of key 4 the plate 103 and sectors 83 are released to the action of the springs connected thereto. Beneath the function key 5, which is depressed after both of the numbers to be multiplied have been placed into the machine, there is located a lever 185, shown in Fig. 3, similar to lever 97 except that this lever 185 is fixed to the shaft 59 which is mounted for turning movement about its axis on the side supports 17 and 18. Adjacent the left end of shaft 59 there is fixed a lever 186 which extends downwardly and which is connected to a rod 187 which actuates the sectors 85 of the revolution counter the same way that the rod 98 actuates the sectors 18, the sectors 85 cooperating with the pins of carriage 46 in the same way that the sectors 83 cooperate with the pins of carriage 47.

By any suitable construction known to those skilled in the art, the notched bar 161 is turned in a clockwise direction, as viewed in Fig. 2, after the operation of keys 4 and 5 so as to permit the machine to carry out a multiplication process. The lever 161 may be turned in this direction by a cam and lever controlled thereby. The clockwise movement of lever 161 permits the carriage 86 to move laterally step by step so as to carry out an automatic, shortened multiplication as disclosed in U. S. Patent 1,968,201. During this operation the carriage 86 is moved from left to right by the spring 175.

The controlling apparatus of the machine is illustrated in Figs. 6, 7 and 8. At the left end of shaft 75 there is pivotally mounted a one-tooth lever 188 which operates in an additive sense and a similar one-tooth lever 189 which operates in a subtractive sense, the two levers being connected to a common drive bar 190 which is formed with a slot 191 located about the main operating shaft 114 and carries two rollers 193 and 194 which respectively engage the periphery of the disc 192 eccentrically mounted on shaft 114 for turning movement therewith, so that the bar 190 is reciprocated upon rotation of shaft 114. The bar 190 is directly linked to lever 188 and is linked to lever 189 through the medium of an intermediate link 195 which is connected to lever 189 on an opposite side of shaft 75 from the connection of bar 190 to lever 188 so that the levers 188 and 189 turn in opposite directions upon reciproation of bar 190. The periodic movement of carriage 86 is controlled by levers 196, there being a lever 196 for each position of the carriage. These levers 196 respectively engage cams 197 fixed on the shaft 93 so that the levers 196 are turned by the cams 197 about the shaft 92 which pivotally supports these levers 196. Each cam 197 is provided with a projection 198 which corresponds to the zero position of a numbered wheel 95. The levers 196 are each provided with a lower end portion which is adapted to bear against the stepped end of a control rail 199, in a known manner (see the above mentioned Patent No. 1,968,201). The rail 199 is mounted for longitudinal sliding movement on a rail 200 and is provided with pins 201 and 202 which extend through slots in the rail 200 so as to guide the movement of rail 199. A spring 204 is connected to the rail 199 and urges the same against one of the control levers 196. The right-hand pin 202 extends for a substantial distance below the rail 200 and is in engagement with the inclined surface of a stop 205 of a double-armed lever 206 which is mounted for turning movement on and about the shaft 79. The left-hand arm of lever 206, as viewed in Fig. 6, is located beneath a stop pin 207 of the pawl 136 which was described above.

Upon each lateral movement of carriage 86 provided by the turning of a lever 198, the spring 175 urges the next lever 196 against the rail 199, and the impact of these two members causes the rail 199 to move to the right, as viewed in Fig. 7, against the action of spring 204 so that the pin 202 moves against the stop 205 to turn the lever 206 in a clockwise direction about shaft 79, as viewed in Fig. 6, and in this way the left end of lever 206 engages pin 207 to turn pawl 136 in a counterclockwise direction so as to cause the starting of the motor 112 by the mechanism described above.

In order to carry out division, the control rail 199 must be moved out of the range of the control levers 196 so that the carriage 86 may then move from the right to the left, as is well known. In order to move the control rail 199 away from the control levers 196, there is provided a device which is not illustrated in the drawings and which for example may be controlled by a lever extending laterally from the lever 12. In place of the stepped lever 199, a known device is provided to enable the machine to carry out automatic division, such a known device being disclosed, for example, in U. S. Patent No. 1,912,133.

In order to be able to use the entire capacity of the machine for division, the right hand pin carriage 47 must be moved to an extreme left hand position after the dividend is set into the machine. For this purpose the division key 6 is provided with an extension 208 extending to the right, as shown in Fig. 2. This extension 208 is located over the plate portion 58 of the turnable stop 56 and therefore, when the key 6 is depressed the extension 208 depresses plate portion 58 to turn stop 56 out of engagement with an upper pin 53 of carriage 47. In this way the carriage 47 is released and drawn to the left by the spring 50 until the carriage 47 strikes against the lever 209. This lever is mounted for turning movement on a shaft 210, fixed to the base 16 of the machine, and is linked to the bar 211 which is connected to the cross rod 100 so that the sectors 83 and plate 103 turn when the carriage 47 strikes against lever 209.

In order to obtain the quotient, the pin carriage 47, into which the divisor as well as the dividend is set, must again be moved to the extreme left position. Therefore the key 7 is provided with an extension 213 which cooperates with stop 56 in the same way as extension 208 of key 6.

The zeroing members 77 and 187 have been described above. Any suitable device, several of which are known to persons skilled in the art, may be provided to return the carriages 46 and 47 to their original position of rest. See for example U. S. Patent 2,034,345, which discloses a device which, with obvious modifications, may be used to return the pin carriages 46 and 47.

In Fig. 9 of the drawings there is shown a tens-carrying mechanism which may be used with the above-described calculating structure on the right side of the machine, as well as with other structures. The gears 90 located on shaft 93 of carriage 86, respectively, are fixedly connected to the numbered wheels 91 which in turn are respectively fixed to a one-tooth sector 220 located on each wheel 91 on the opposite side thereof from a gear 90. Each lever 221 of the tens-carrying mechanism cooperates with a sector 220, this lever 221 being pivotally mounted on the stationary shaft 222 of carriage 86 and being urged by spring 223 toward an upper part of the notched lever 224, the latter being pivotally mounted on the shaft 225 of carriage 86. The levers 221 extend through the calculating mechanism, as shown in Figs. 3 and 9, and if desired may be provided with the longitudinal slots for this purpose. As is illustrated in the drawings these levers may advantageously extend through the space between each one-tooth sector 220 and the shaft 92 upon which the immediate gears 89 are mounted. The levers 221 are each provided with a projection 226 which cooperates with the single tooth of sector 220, and lever 221 is also provided with a pin 227 which is adapted to be located in one of the notches 228 or 229 of the notched levers 224. The levers 221 are each provided with an elongated slot 230 which is located about a pin 231 of a tens-carrying starting lever 232. These pins 231 serve also as pivot pins for the pawls 233 which are adapted to have portion 234 thereof engage with the teeth of an intermediate gear 89. The notched levers 224 are each provided with a bent arm 235 which serves as a stop and cooperates with the portion 236 of each cam 238 mounted on the shaft 237. The portions 236 of the successive cams 238 are staggered in a continuous fashion with respect to each other. The shaft 237 and cams 238 therewith are rotated by the motor 112, gearing 113 and gearing 239 (Fig. 3). Above the stop arm 235 of each notched lever 224 there is located in the path of portion 236 of a cam 238 a lateral stop 240 of the starting levers 232, the latter being formed with a slot 241 located about shaft 225 so that the levers 232 are capable of lengthwise movement as well as turning movement, these levers 232 being urged by springs 242 into the slots 244 of the floor portion 245 of carriage 86. Each pawl 233 is provided with a specially shaped arcuate slot 243 which is located about a pin 227 of lever 221.

In Fig. 10 of the drawings there is illustrated a tens-carrying mechanism which may be used with the above-described revolution counter as well as with other revolution counters. As is shown in Fig. 10, the gears 94 mounted on shaft 93 of carriage 86 are respectively joined to numbered wheels 95 for rotation therewith, the latter respectively being fixedly connected to the cams 197 which cooperate with levers 196 to carry out the known shortened multiplication process. Each of these cams 197, as is well known, is provided, at zero position, with a projection 198, a somewhat lower curved part 250 which comes into play when the digits being multiplied are from 1–5, and a still lower curved portion 251 which comes into play when the digits being multiplied are 6–9. The control lever 196 is shown in Fig. 10 engaging the rail 199, as was described above. Each control lever 196 is urged in a counterclockwise direction about shaft 92 by a spring 252. On a shaft 253 extending laterally across the carriage 86 and being mounted thereon, there is pivotally supported a plurality of levers 254 which are respecitvely located over each control lever 196 and each of which is provided with a lower projection 255 which cooperates with the projection 198 of cam 197, in accordance with the direction of rotation of the latter, so as to be turnable on both sides of a central position. Each lever 254 is connected to a spring 256 which urges it towards its central position. This spring maintains the lever 254, after turning by engagement with projection 198, in position with the pin 257 of lever 254 located in one of the notches 259, 260 or 261 of the notched levers 258. These latter levers are turnable about the transverse shaft 262, mounted on carriage 86, and are each under the influence of a spring 263 which tends to turn it in a counterclockwise direction about shaft 262, as viewed in Fig. 10. Each notched lever 258 is formed with an elongated slot 264 which is located about a stationary shaft 265 mounted on the carriage 86, and the lower arm of each lever 258 is provided with a stop 266 located in the path of portions 267 of cams 269 mounted on shaft 268 for rotation therewith.

As is shown in Fig. 10, the stop portions 267 of each pair of adjacent cams 260 are staggered with respect to each other in a reverse direction with respect to the direction of rotation of cams 269 indicated by the arrow in the upper right hand part of Fig. 10. One cam is provided for each of the numbered wheels of the revolution counter. The portion 267 of cams 269 serve to start the operation of the tens-carrying mechanism and therefore work upon the upper follower 270 and the lower follower 271 of each lever 272 which is linked to lever 254 by pin 257 so as to move upon movement of lever 254 and so as to have its upper left hand end, as viewed in Fig. 10, aligned with one of the notches 259—261. Each lever 272 is urged, in its position at rest, against the right hand end of guide slot 273, formed in floor portion 245 of carriage 86, by the spring 263. These levers 272 are each provided on the opposite side of followers 270 and 271 with a projection 274.

In accordance with the elevation of the lever 254, either the follower 270 or the follower 271 is engaged by portion 267 of a cam 269 so that the turning of lever 272 resulting from engagement of part 267 of a cam 269 and one of the followers 270, 271 results in turning of lever 272 and movement of projection 274 into engagement with either an upper pawl member 275 or a lower pawl member 276. These latter pawl members are respectively linked to links 277 and 278 which are respectively turnable about the stationary shafts 265 and 262 of the carriage 86. The pawls 275 and 276 are respectively urged to their rearward position of rest by springs 279 and 280 which are connected to the notched lever 258. In this position of rest the pawls 275 and 276 engage the rear bent parts of crossmember 281 which is mounted on the carriage 86 and which limits the rearward movement of the pawls 275 and 276. The member 281 has a front wall portion provided with vertically extending slots 282 through which the pawls 275 and 276 extend, these slots 282 guiding the movement of the pawls so as to prevent lateral play thereof and limiting their turning movement so as to prevent overrunning of intermediate gears 89a with which they are adapted to engage.

The above described machine operates as follows:

In order to carry out an addition, the selection lever 12 is moved to the central position, as illustrated in Fig. 1, the parts controlled by this lever 12 then assuming the position illustrated in Fig. 2. The carriage 86 is located at the right of the machine in such a position that the gears 90 of the right hand calculating mechanism are in line with the additive gear teeth 83a of the sectors 83. In this position of carriage 86 the gears 94 of the left result indicating mechanism, that is of the revolution counter, are located between the sectors 85, while the single-tooth lever 188 assumes the position shown in Figs. 6 and 7 so that it may engage an intermediate gear 89a (Fig. 6).

The keys 1 are depressed in order to set the numbers to be added into the machine. These keys turn the swing members 38 so that the right hand projections 40 move the proper pins 55 to the rear. After each key 1 turns a corresponding swing member 38, it turns the swing member 35 so that the projection 37 will move the pin 53 engaging stop 56 to the rear, and as a result the pin carriage 47 steps to the left under the action of spring 50 until the next pin 53 engages the stop 56. In this way the successive digits of the numbers to be added are set into the machine. The movement of pins 53 and 55 causes the tooth sectors 65 to turn under the action of springs 69 until their lower projections 72 respectively engage the lateral projections of pins 55 which have been moved to the rear, so that the number which has been depressed appears in the window 13.

After a particular number to be added has been set into the machine, the addition key 2 is depressed. As a result, the lever 96 is turned in a counterclockwise direction about shaft 59 so that the bar 98 turns rail 101 in a counterclockwise direction about shaft 102. The sectors 83 and the plate 103 shortly thereafter are thereby released to the action of springs 105 and 111, respectively, so that the projections 106 of the sectors 83 engage the pins 55 which have been moved to the rear by keys 1. As was mentioned above, there is no pin 55 corresponding to a zero, and therefore the sector 83 corresponding to this digit turns until it engages the upper edge portion of rail 107.

The turning of plate 103 causes the pawl 132 pivotally mounted thereon to strike with its lower arm 135 against the upper arm 137 of pawl 136 so as to turn the latter in a counterclockwise direction, as viewed in Fig. 3, these pawls cooperating after sectors 83 have been locked in a predetermined angular relationship by bar 119. As a result, the double-armed lever 140, which up to this time was resting on the upper portion 139 of pawl 136, no longer is in engagement with pawl 136 and therefore turns under the action of spring 142 in a counterclockwise direction about shaft 79. This causes the springy contacts 155 mounted on the lower arm 156 of lever 140 to move into engagement with the insulated roller 154 mounted on the lower arm 153 of lever 141, these contacts 155 being pressed together by this movement so as to close the circuit to motor 112. The latter then drives the gearing 113 which is connected to the main operating shaft 114 of the machine, and this shaft then rotates in a counterclockwise direction, as viewed in Fig. 3.

The turning of lever 140 under the action of spring 142 causes the end 144 of lever 140 to move out of engagement with the pawl 146 so that the latter is released to the influence of spring 147 and is moved downwardly so that its tooth 148 engages with the ratchet wheel 149 fixedly mounted on shaft 114 so as to cause the cam 145 to rotate with shaft 114. This turning of cam 145 in a counterclockwise direction, as viewed in Fig. 3, produces a clockwise turning of lever 141 about shaft 79 so that the insulated roller 154 constantly holds the contacts 155 together and at the same time turns the lever 140 in a clockwise direction about shaft 79 against the action of spring 142 until the left hand stop 143 of lever 140 again engages the portion 139 of pawl 136. At the end of a rotation of shaft 114, the roller 152 of lever 141 falls behind the step 150 of cam 145 and thereby opens the circuit suddenly. Since the motor and the gearing connected thereto turn a further distance due to inertia, the pawl 146 presses against the right-hand stop 144 of lever 140 and is moved away from ratchet wheel 149 so that the cam 145 is no longer coupled to the shaft 114.

During the above described operations, the sectors 83 were moved to turn the intermediate gears 89 by members 121, 115, 117 and 119 in the manner already described above. In this way the numbers transferred to the sectors 83 by pins 55 are turned into the result indicating mechanism. At the end of the above-described rotation of shaft 114, the zeroing devices return the parts of the machine to their original positions so that the pins 55 of carriage 47 are zeroed and the sectors 65 are again in their position of rest.

During each revolution, as described above, the one tooth sector 188 shown in Figs. 6 and 7 is turned by eccentric disc 192, which also turns through one revolution, so that it engages the intermediate gear 89a in the first position of the revolution counter and causes the turning of a numbered wheel 95 to indicate the revolution of the shaft 114. In this way the revolution counter serves to post the number of items added. Thus the revolution counter serves during addition, and also during subtraction to be described below, as a device for indicating the number of items posted in the machine. It is to be understood, of course, that the above described operation takes place for each number which is added.

In order to carry out a subtraction with the above-described structure, the numbers to be subtracted are set into the machine in the same way as with addition. However, upon actuation of the subtraction key 3, the lever 82 and the rod 183 connected thereto turn the support 176 forwardly so that the left inclined slot 177 thereof is moved. This slot is now in engagement with pin 181 of the carriage 86 so that the latter is moved to the right by a distance corresponding to one half of the space between a pair of adjacent sectors 83. As a result the intermediate gears 89 are now no longer in line with the additive teeth 83a, but instead are in line with the subtractive teeth 83b so as to mesh with the latter when the frame 80 is raised in the manner described above. The teeth 83b subtract by rotating in the same direction as teeth 83a while turning into the mechanism above sectors 83a value which is the complement of the numbers set into the machine by the keys 1.

In order to carry out a multiplication the selection lever 12 is moved into the lower position shown in Fig. 1. In this way the bar 168 extending laterally from lever 12 turns lever 169 and the vertically extending rod 162 therewith so as to turn lever 170, bar 171 linked thereto and sleeve 172 slidably mounted on the shaft 87, this sleeve being moved to the right so as to compress the spring 175. At the same time the movement of lever 12 moves the rod 158 so as to turn lever 160 forwardly, and in this way the lever 161 can swing forwardly under the action of spring 163 as soon as the carriage 86 is moved to the left until its pin 167 moves into the notch 164 of lever 161. Before this happens, however, the carriage 86 remains temporarily in the position shown in Fig. 2.

The keys 1 are first depressed to set the multiplicand into the machine. In the same manner as with addition, the right-hand pin carriage is actuated by the keys 1 at this time and steps to the left as described above. The multiplicand is then visible in the window 13 of cover 19. After the multiplicand is set into the machine, the key 4 is depressed. This causes a turning of the lever 184 which moves the rod 34 and the member 33 fixedly mounted thereon so as to move the inclined stop member 32 and carriage 29 therewith to the left by a distance equal to one half of the distance between adjacent vertical rows of pins on the carriages 46 and 47. At the same time, the rod 34 acts on the cross rod 100 to turn the rail 101 so as to free the sectors 83 which thereby take up the multiplicand. A device, of any suitable construction (not shown), is provided to prevent the turning of the result indicating mechanism on the right hand side of the machine as well as to prevent the zeroing of the pins 55 and sectors 65 of the right hand pin carriage 47, this device also preventing the return of this carriage 47 to its original position. The multiplier is then set into the machine by the keys 1 which at this time, as a result of the leftward movement of support 29, actuate the pins of carriage 46 so that this carriage takes up the multiplier and steps to the left, in the same way as carriage 47, under the action of spring 49. The multiplier then appears in window 14 of cover 19.

After both of the numbers to be multiplied have been set into the machine, the key 5 is depressed. In the meantime the carriage 86 has been moved to the left, by a mechanism known to those skilled in the art and not described above, until its pin 167 engages the notch 164 of lever 161. In this way the single tooth sector 188 is located out of the region of the revolution counter and the latter is then located in the region of the left calculating mechanism. The key 5, through lever 185, turns the shaft 59 about its axis so as to also turn the lever 186 and bar 187 connected thereto so as to operate the sectors 85 to set the multiplier into the revolution counting mechanism 89a, 94. After the multiplier has been set into the revolution counter the lever 161 is turned in a clockwise direction, as viewed in Fig. 2, so that the carriage 86 is freed to the influence of spring 175 which urges it to the right until one of the control levers 196 corresponding to the first position of the revolution counter engages the stepped end of rail 199. As was described above, the latter is thereby temporarily moved against the action of spring 204 to the right and turns, by means of the pin 202, the lever 206 in a clockwise direction, as viewed in Fig. 6, so that the left end of this lever engages the pin 207 of pawl 136 to turn the latter in a counterclockwise direction, as viewed in Fig. 6. The movement of carriage 86 under the influence of spring 175 causes the one-tooth sectors 188 and 189 to again cooperate with the revolution counter so that the multiplier is turned into the right-hand result indicating mechanism by the known shortened multiplication process mentioned above. The control levers 196 successively cause actuations of the mechanism until the value of the multipler in the revolution counter is turned out of the same. At the end of this process the carriage 86 rests against a stop member 212 located at the right hand end of the guide shaft 87 of the carriage, as shown in Fig. 1.

The function keys 8, 9, 10 and 11 are provided for zeroing purposes in order to remove certain numbers from the machine. The exact construction of the zeroing structure associated with keys 8—11 forms no part of the present invention and is not illustrated in the drawings. The various keys 8—10 serve to zero separate parts of the mechanism while the key 11 zeros the entire machine.

In order to carry out a division, the selection lever 12 is moved to the upper position shown in Fig. 1. The moving of the lever 12 into this upper position causes the lever 168 to turn members 169, 170 and 171 so that the sleeve 172 is moved to the left, as viewed in Fig. 2, until the spring 174 applies an appreciable force on the carriage 86 to urge the same to the left, as viewed in Fig. 2. Simultaneously with the movement of bar 168, the bar 158 and lever 160 turn the lever 161 about shaft 162 in a clockwise direction, as viewed in Fig. 2. Through a mechanism not illustrated in the drawings the carriage 86 is moved to the right, so that the pin 167 enters the notch 166 of lever 161, and in this position of carriage 86, the pin 181 thereof is located opposite the inclined slot 178. The dividend is then set into the machine with the keys 1 and is picked up by the pin carriage 47, the dividend appearing in window 13 of the cover 19. Then the division key 6 is depressed so as to raise the stop 56 and bring about a movement of carriage 47 to the left under the action of spring 50 until the carriage 47 strikes against the lever 209. In this way the bar 211 is moved to the rear, so as to turn cross rod 100 and rail 101 therewith to permit the sectors 83 to take up the dividend set into the pin carriage 47. The operation of the machine at this point is the same as that which takes place during addition and the dividend appears in the right hand part of window 15. The dividend is removed from carriage 47 by the machine and the divisor is then set into the machine in the same way as the dividend and is received in the pin carriage 47. Then the key 7 is depressed so that the extension 213 again turns the stop 56 to free the carriage 47 to the influence of spring 50 so that the carriage 47 again engages the lever 209. In the meantime the multiplication rail 199 (Figs. 6-8) has been moved by a mechanism, as shown in the above-mentioned U. S. Patent No. 1,912,133, out of the region of the control levers 196 and in its place a known mechanism for automatically carrying out a division has been moved into its operative position. The key 7 actuates the lever 182 in the same way as the subtraction key 3 so as to turn the support 176 and rail 179 therewith forwardly. In this way the slot 178 engages the pin 181 to move the carriage 86 to the right by a distance equal to one half of the space between a pair of adjacent sectors 83, and the intermediate gears 89 are therefore in line with the subtractive teeth 83b of sectors 83 so as to mesh with the latter and subtract the divisor from the dividend in a known manner. In this way the number of revolutions for each position of the mechanism during the division process is turned into the revolution counter so that the latter gives the quotient.

The tens-carrying mechanism shown in Fig. 9 and described above operates in the following manner:

When one of the gears 90 turns so as to turn a numbered wheel 91 from 9 to 0, the single toothed sector 220 associated with this wheel 91 turns a lever 221 in a clockwise direction, as viewed in Fig. 9, by engagement with the projection 226 of lever 221. In this way the pin 227 of the lever 221 is moved out of the notch 229 of the notched lever 224 and into the notch 228 thereof. This movement of levers 221 and 224 causes the lever 232 to be moved downwardly by engagement of slot 230 and pin 231, and the pin 231 moves to the right hand end of slot 230, as viewed in the drawings, so that the levers 221 and 232 are in this way constrained to move together. This movement of the above-mentioned parts causes the pawl 233 to move into its lower operative position which is illustrated in Fig. 9.

When the cam 238, associated with the particular lever 232 which has been operated as described above, turns so that the portion 236 thereof engages the portion 240 of lever 232, the latter is turned in a clockwise direction as viewed in Fig. 9. This causes the pawl 233 to turn in a counterclockwise direction about pin 227 which is engaged by the slot 243 of the pawl 233, and the shape of this slot is such that the tooth 234 of pawl 233 is moved radially into the teeth of the intermediate gear 89 associated with the gear 90 and numbered wheel 91 of the next decade located next to the gear 90 and numbered wheel 91 associated with the lever 221 which has been actuated as described above. After this radial movement of tooth 234 of pawl 233, the shape of slot 243 causes the tooth 234 to move tangentially of gear 89 so that this gear moves the gear 90 associated therewith through a distance corresponding to one tooth. Since the tooth 234 of pawl 233 is forced by pin 227 and slot 243 to rest against a tooth of gear 89, after the above described movement of the latter, an overrunning of gear 89 and members 90 and 91 associated therewith is avoided.

The continued turning of cam 238 causes the projection 236 thereof to move against the portion 235 of notched lever 224 so as to turn the latter in a clockwise direction, as viewed in Fig. 9, and thereby permit the pin 227 of lever 221 to move under the action of spring 223 into the upper notch 229 of lever 224 which causes a counterclockwise turning of lever 221. In this way the lever 221 raises the lever 232 and pawl 233 upwardly so that the latter has the tooth 234 thereof move radially out of the teeth of gear 89 due to the shape of slot 243. After the part 236 of cam 238 has moved beyond portion 240 of lever 232, the spring 242 urges the lever 232 in a counterclockwise direction about shaft 225 so that the lever 232 moves the pawl 233 as viewed in Fig. 9 back to its inoperative position of rest.

The tens-carrying mechanism illustrated in Fig. 10 of the drawings operates in the following manner:

Assuming that the machine is carrying out a multiplication involving any of the digits 6-9, a control lever 196 then rests on the lowermost curved part 251 of a cam 197 and actuates the multiplication rail 199 to carry out a subtractive calculating process in the calculating mechanism until the zero projection 198 of cam 197 is turned beyond the lever 196. This zero projection 198 then turns the lever 254 in a counterclockwise direction, as viewed in Fig. 10. When this occurs the tens-carrying mechanism assumes the position illustrated in Fig. 10. The pin 257 of lever 254 is located in the upper notch 261 of lever 258 and has moved the lever 272 upwardly. The cam 269, turning in the direction of the arrow, then engages the lower follower 271 of lever 272 so as to turn the latter to move projection 274 thereof against the upper pawl member 275. This pawl member is located opposite the intermediate gear 89a associated with the numbered wheel located next to the numbered wheel connected to the particular cam 197 which is associated with the particular lever 254 described above. Therefore the movement of pawl 275 by projection 274 of lever 272 causes this next gear 89a to turn in a counterclockwise direction, as viewed in Fig. 10, in an additive sense by a distance corresponding to one tooth of gear 89a. Since the turning movement of pawl 275 is limited by slot 282, the pawl 275 cannot move upwardly from the gear 89a and therefore brakes the latter to prevent overrunning thereof. The continued turning of cam 269 causes portion 267 thereof to engage the stop 266 of lever 258 and turns the latter in a clockwise direction, as viewed in Fig. 10, about shaft 262 so that the pin 257 of lever 254 is released. This lever is then drawn by spring 256 back to its central position where the pin 257 engages the central notch 260 of lever 258, and the lever 272 is also moved by this movement of lever 254. This latter movement of lever 272 causes projection 274 thereof to be moved into the free space between both of the pawls 275 and 276 so that the pawl 275 may be returned by spring 279 back to its position of rest, and all of the parts are then in their original position.

As was mentioned above, the revolutions counter functions during addition to post the number of items added. When an error in adding is corrected by subtraction, one of the items posted is turned out of the revolutions counter. When the machine is so operating, the gears 94 turn over the zero position so that the lever 254 is turned in a clockwise direction, and in this way brings the pawl 276 into play, the pin 257 then being located in notch 259 and the cam 269 then engaging follower 270 of lever 272. The above described operation also takes place when, instead of carrying out a shortened multiplication by turning the multiplier out of the revolution counter, the multiplier is turned into the revolution counter.

The invention described above and claimed below is also disclosed in co-pending applications having Serial Numbers 262,722, 265,432, and 265,431.

It will be understood that each of the elements described above, or two or more together, may also find a useful application in other types of calculating machines differing from the types described above.

While the invention has been illustrated and described as embodied in a calculating machine adapted to carry out all four types of calculations with a single keyboard of ten keys, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A tens-carrying mechanism for the revolution counter of a calculating machine having a numbered wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear; and mounting means operatively connected to said lever and moving means for selectively mounting the latter in an operative position with respect to one of said pawls in accordance with the direction in which said lever is turned by said cam.

2. A tens-carrying mechanism for the revolution counter of a calculating machine having a numbered wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear; mounting means operatively connected to said lever and moving means for selectively mounting the latter in an operative position with respect to one of said pawls in accordance with the direction in which said lever is turned by said cam; and spring means operatively connected to said pawl members to urge the same away from the gear.

3. A tens-carrying mechanism for the revolution counter of a calculating machine having a numbered wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear; mounting means operatively connected to said lever and moving means for selectively mounting the latter in an operative position with respect to one of said pawls in accordance with the direction in which said lever is turned by said cam; spring means operatively connected to said pawl members to urge the same away from the gear; and stop means associated with said pawls for limiting the movement thereof away from the gear.

4. A tens-carrying mechanism for the revolution counter of a calculating machine having a numbered wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear; mounting means operatively connected to said lever and moving means for selectively mounting the latter in an operative position with respect to one of said pawls in accordance with the direction in which said lever is turned by said cam; and guide means located in the calculating machine and being associated with said pawls for guiding the movement thereof.

5. A tens-carrying mechanism for the revolution counter of a calculating machine having a numbered wheel, comprising in combination, a cam joined to the numbered wheel for rotation therewith and having a projection corresponding to the zero of the numbered wheel; a first stationary shaft located over the cam; a first lever mounted on the stationary shaft for movement thereabout and having an end portion engaging said cam so that said lever will turn in opposite directions in accordance with the direction of rotation of the cam; a pin mounted on said first lever; a second stationary shaft; a second lever mounted on said stationary shaft for turning movement thereabout and being formed with three notches adapted to selectively engage said pin; spring means operatively connected to said first lever for urging the pin thereof into one of said notches; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear, said moving means comprising a third lever fixed to said pin and having a projection adapted to be located between said pawl members when said pin is in the central one of said three notches and to be located alternately opposite said pawl members when said pin is alternately located in the other two of said three notches, respectively; and cam means associated with said third lever for moving said projection thereof against one of said pawls so as to move the latter.

6. A tens-carrying mechanism for the revolution counter of a calculating machine having a numbered wheel, comprising in combination, a cam joined to the numbered wheel for rotation therewith and having a projection corresponding to the zero of the numbered wheel; a first stationary shaft located over the cam; a first lever mounted on the stationary shaft for movement thereabout and having an end portion engaging said cam so that said lever will be turned in opposite directions in accordance with the direction of rotation of the cam; a pin mounted on said first lever; a second stationary shaft; a second lever mounted on said stationary shaft for turning movement thereabout and being formed with three notches adapted to selectively engage said pin, said second lever having a projection located adjacent one end thereof; spring means operatively connected to said first lever for urging the pin thereof into one of said notches; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear, said moving means comprising a third lever fixed to said pin and having a projection adapted to be located between said pawl members when said pin is in the central one of said three notches and to be located alternately opposite said pawl members when said pin is alternately located in the other two of said three notches, respectively; and cam means associated with said third lever for moving said projection thereof against one of said pawls so as to move the latter, said cam means being adapted to engage said projection of said second lever after movement of said pawls so as to turn said lever to permit said spring means to move said pin into said central notch.

7. A tens-carrying mechanism for the revolution counter of a calculating machine having a numbered wheel, comprising in combination, a cam joined to the numbered wheel for rotation therewith and having a projection corresponding to the zero of the numbered wheel; a first stationary shaft located over the cam; a first lever mounted on the stationary shaft for movement thereabout and having an end portion engaging said cam so that said lever will turn in opposite directions in accordance with the direction of rotation of the cam; a pin mounted on said first lever; a second stationary shaft; a second lever mounted on said stationary shaft for turning movement thereabout and being formed with three notches adapted to selectively engage said pin; spring means operatively connected to said first lever for urging the pin thereof into one of said notches; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear, said moving means comprising a third lever fixed to said pin and having a projection adapted to be located between said pawl members when said pin is in the central one of said three notches and to be located alternately opposite said pawl members when said pin is alternately located in the other two of said three notches, respectively, said third lever having a pair of followers mounted thereon; and cam means associated with said third lever to alternately engage one of said followers thereof for moving said projection thereof against one of said pawls so as to move the latter.

8. A tens-carrying mechanism for the revolution counter of a calculating machine having a numbered wheel, comprising in combination, a cam joined to the numbered wheel for rotation therewith and having a projection corresponding to the zero of the numbered wheel; a first stationary shaft located over the cam; a first lever mounted on the stationary shaft for movement thereabout and having an end portion engaging said cam so that said lever will turn in opposite directions in accordance with the direction of rotation of the cam; a pin mounted on said first lever; a second stationary shaft; a second lever mounted on said stationary shaft for turning movement thereabout and being formed with three notches adapted to selectively engage said pin; spring means operatively connected to said first lever for urging the pin thereof into one of said notches; a pair of pawls located opposite a gear of the revolution counter and being mounted in the calculating machine for movement toward and away from the gear, one of said pawls being adapted to engage the gear to turn the same additively and the other of said pawls being adapted to engaged the gear to turn the same subtractively; moving means for moving one of said pawl members toward the gear, said moving means comprising a third lever fixed to said pin and having a projection adapted to be located between said pawl members when said pin is in the central one of said three notches and to be located alternately opposite said pawl members when said pin is alternately located in the other two of said three notches, respectively, said third lever having a pair of followers mounted thereon; cam means associated with said third lever to alternately engage one of said followers thereof for moving said projection thereof against one of said pawls so as to move the latter; and an additional spring means interconnecting said second and third levers for urging said pin into one of said notches.

9. A tens-carrying mechanism for the revolution counter of a calculating machine having a numerbed wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear; mounting means operatively connected to said lever and moving means for selectively mounting the latter in an operative position with respect to one of said pawls in accordance with the direction in which said lever is turned by said cam; guide means located in the calculating machine and being associated with said pawls for guiding the movement thereof; and support means supporting said pawl members for movement in said guide means.

10. A tens-carrying mechanism for the revolution counter of a calculating machine having a numbered wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear; mounting means operatively connected to said lever and moving means for selectively mounting the latter in an operative position with respect to one of said pawls in accordance with the direction in which said lever is turned by said cam; guide means located in the calculating machine and being associated with said pawls for guiding the movement thereof; and support means supporting said pawl members for movement in said guide means, said support means comprising a pair of stationary shafts respectively located adjacent to said pawl members, and a pair of links respectively mounted for turning movement on said pair of shafts and respectively being pivotally connected to said pawl members.

11. A tens-carrying mechanism for the revolution counter of a calculating machine having a numbered wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively;

moving means for moving one of said pawl members toward the gear; mounting means operatively connected to said lever and moving means for selectively mounting the latter in an operative position with respect to one of said pawls in accordance with the direction in which said lever is turned by said cam; and guide means located in the calculating machine and being associated with said pawls for guiding the movement thereof, said guide means comprising a plate member formed with a pair of slots through which said pawl members respectively extend, said slots limiting the turning movement of said pawl members so as to prevent overrunning of a gear engaged by one of said pawl members.

12. A tens-carrying mechanism for the revolution counter of a calculating machine having a numbered wheel, comprising in combination, a cam joined to the numbered wheel for rotation therewith and having a projection corresponding to the zero of the numbered wheel; a stationary shaft located over the cam; a lever mounted on the stationary shaft for movement thereabout and having an end portion engaging said cam so that said lever will be turned in opposite directions in accordance with the direction of rotation of the cam; a pair of pawls located opposite a gear of the revolution counter and being mounted in the calculating machine for movement toward and away from the gear, one of said pawls being adapted to engage the gear to turn the same additively and the other of said pawls being adapted to engage the gear to turn the same subtractively; moving means for moving one of said pawl members toward the gear; mounting means operatively connected to said lever and moving means for selectively mounting the latter in an operative position with respect to one of said pawls in accordance with the direction in which said lever is turned by said cam; and a multiplication controlling lever also resting against said cam to be operated thereby.

KARL WESTINGER.
ERNST ALTENBURGER.
OTTO HIRT.

References Cited in the file of this patent

UNITED STATES PATENTS

| Number | Name | Date |
|---|---|---|
| 998,145 | Wolter | July 18, 1911 |
| 1,112,063 | Goldberg | Sept. 29, 1914 |
| 1,224,872 | Walter | May 1, 1917 |
| 1,421,201 | Foothorap | June 27, 1922 |